May 5, 1959
R. C. KERSH
2,885,271
APPARATUS FOR MIXING AND DISTRIBUTING WATER
SOLUBLE MATERIAL WITH WATER
Filed Dec. 20, 1954
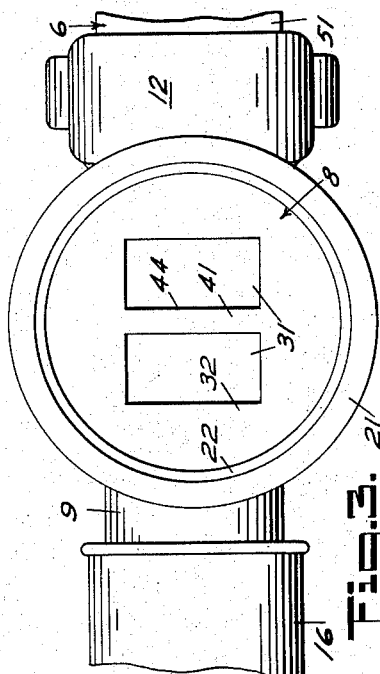
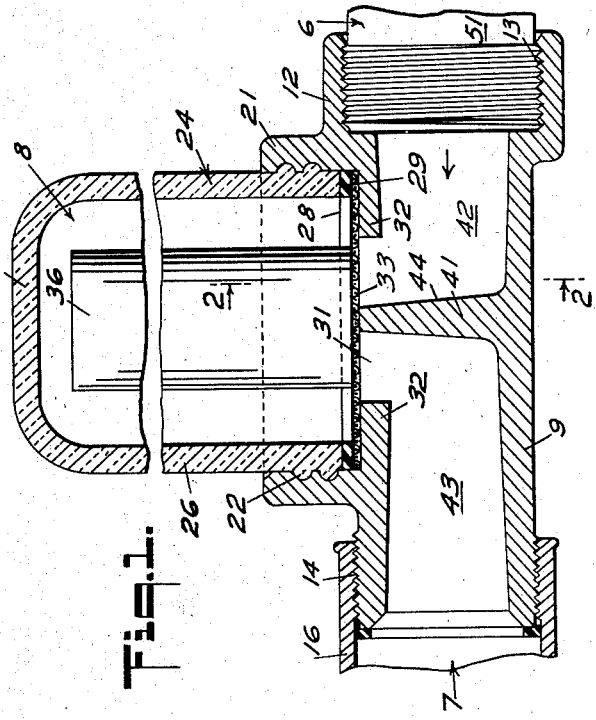
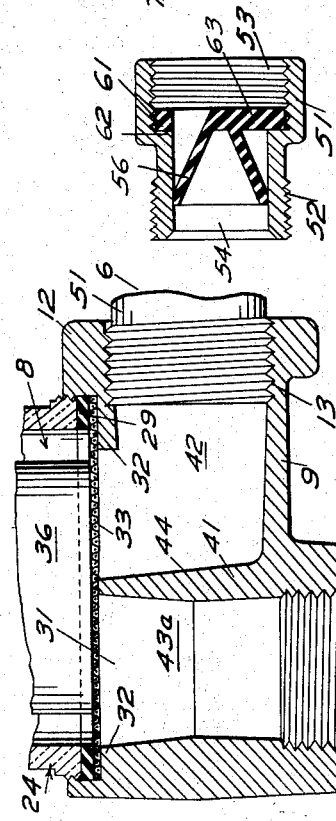
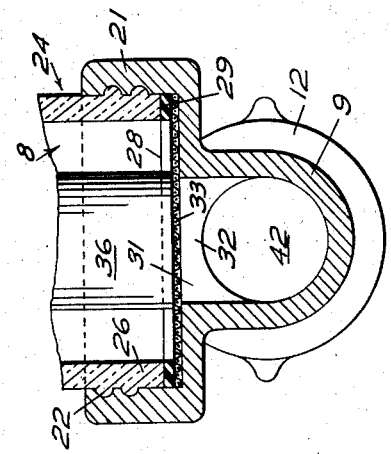
INVENTOR
RONALD C. KERSH
BY
Gardner + Zimmerman
ATTORNEYS United States Patent Office 2,885,271
Patented May 5, 1959

2,885,271

APPARATUS FOR MIXING AND DISTRIBUTING WATER SOLUBLE MATERIAL WITH WATER

Ronald C. Kersh, Orinda, Calif.

Application December 20, 1954, Serial No. 476,325

2 Claims. (Cl. 23—267)

This invention relates to devices for feeding water soluble fertilizer, insecticides, or the like into a stream of water, and is more particularly directed towards such a device which is adapted for ready attachment onto garden hoses or the like.

Heretofore, numerous devices have been placed on the market by means of which a quantity of fertilizer or the like could be dissolved in a quantity of water for subsequent distribution onto the lawn or soil. However, most of these prior art devices possessed numerous shortcomings and features of disadvantage greatly diminishing their fields of potential use. By way of example, most of these devices were relatively complex in construction and therefore were relatively expensive to construct. Also, it has been found through considerable experimentation that such devices did not provide for adequate dissolution of the fertilizer with the oncoming water stream so that in many cases, an extremely dilute solution was passed on to the lawn or ground. It has been further found that in certain of the prior devices which were available on the market, that there would be a tendency for the water to back up through the inlet line and thereby possibly contaminate the water supply system.

Accordingly, it is an object of the present invention to provide a device of the above character which will overcome the foregoing shortcomings and disadvantageous features. More particularly, an object of the present invention is to provide a fertilizer dissolver and distributor which is extremely simple in construction and equally simple in operational use.

Another object of my invention is to provide a device of the character described which is arranged to thoroughly agitate the fresh water in a chamber containing the water soluble fertilizer, insecticide or other material so that the final solution which is sprayed on the vegetation or lawn possesses a substantial quantity of the material being utilized.

A further object of the invention is to provide a mixer and distributor device of the type referred to which is constructed so that there is no danger of a vacuum being created or other forces coming into being which would tend to cause any reversal of flow and possibly contaminate the water supply system.

Yet another object of this invention is to provide a device of the character referred to adapted for ready attachment to conventional hoses so that it may be selectively utilized for surface spraying or for easy connection to an underground sprinkling or fertilizing system.

A still further object of the invention is to provide a device of the character described in which the fertilizer or other material being introduced into the water is visible from exteriorly of the device so that the user may readily ascertain when a refilling of the apparatus is required.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a cross-sectional elevational view showing the preferred form of hose attachment device.

Figure 2 is a vertical cross-sectional view taken substantially in the plane indicated by line 2—2 of Figure 1.

Figure 3 is a top plan view of the device as shown in Figure 1 with portions thereof removed for clarity.

Figure 4 is a view similar to Figure 1 but illustrating a modified form of the invention.

Figure 5 is a cross-sectional view of a device for preventing back flow in the line.

In broad terms, the mixing and distributing device of the present invention includes an inlet 6 through which water is arranged to pass, an outlet 7, through which the water and fertilizer solution egresses from the device, and a mixing chamber 8 in which the water is agitated and thoroughly mixed with the fertilizer or other material disposed within such chamber. More particularly, as shown in Figures 1 to 3 of the drawing, the device includes a longitudinally extending body 9 having the inlet and outlet, 6 and 7 respectively disposed at opposite ends thereof. Preferably, the inlet 6 is provided by means of an annular body extension 12 having internal threads 13 therein adapted for engagement with a standard garden hose which may be connected to a source of water supply. Conversely, the outlet 7 includes external threads 14 arranged to threadedly receive the internal threaded end of a hose coupling 16. As will be understood, the coupling 16 may be attached to a conventional garden hose where the emerging solution is to be sprayed onto vegetation or lawns, or may be connected directly to an underground lawn sprinkling system. The mixing chamber 8 is positioned intermediate the inlet and outlet and as will be later described in detail, is arranged to receive water from the inlet, thoroughly agitate the same with the fertilizer or other material disposed within the chamber, prior to the emergence of the water from the outlet 7.

The mixing chamber 8 is positioned substantially medially of the inlet and outlet of the device and is defined in part by a boss 21 extending generally normal to the longitudinal axis of the device. The boss 21 is provided with internal threads 22 for receiving the external threads of a transparent cap member 24. The cap member is provided with a cylindrical wall portion 26 and an integral top 27, the end 28 opposite the portion 27 being entirely open. When the cap member is threaded into the boss 21, the end thereof is adapted to engage a resilient gasket 29 for sealing the cap onto the boss. As will be clear from Figures 1 and 2 of the drawing, the body 9 adjacent the chamber 8 is provided with an opening 31 defined by a pair of inwardly directed shoulders 32. These shoulders are arranged to support a screen or grid 33 which overlies the opening 31 and it is against this screen that the gasket 29 is positioned. Thus, the interior of the body 9 is in direct flow communication with the chamber 8 which, as hereinabove described, is defined by the shoulders 32 and the cap member 24 as well as by the water pervious screen 33.

In operation, a single piece 36 of water soluble fertilizer may be placed within the chamber 8 and supported on the screen or grid 33. If desired, instead of a large single piece of material, a plurality of small tablets could be equally well used, so long as the effective size of such tablets would prevent their free flowing through the openings in the screen 33. Thus, as water passes through the chamber, such water will dissolve a quantity of the fertilizer or other material 36 and carry it with the water through the outlet opening 7.

As an important feature of this invention a simple baffle 41 extending across the body 9 is utilized to direct water from the inlet 6 into the chamber 8, and cause agitation of the water in such chamber around the fertilizer or other material positioned therein. As will be seen in the drawing, the baffle 41 defines the otherwise continuous longitudinal bore of the body into an inlet bore 42 and an outlet bore 43. When water comes into the device through the inlet 6 it will pass in the direction of the arrows into bore 42. The water will then engage the surface 44 of the baffle causing the same to flow upwardly through the screen 33 into the fertilizer containing chamber 8. By passing into this chamber, the water will be agitated and caused to be thoroughly mixed with the contents of the chamber before passing outwardly through the screen and opening 31 into the bore 43 from which it finally emerges through the outlet 7.

As hereinabove discussed, one of the major difficulties found in apparatus of this general character is the strong possibility of water containing the fertilizer backing up through the inlet 6 when the water pressure is reduced. By means of the device illustrated in Figure 5, this undesirable result is completely avoided.

Referring to said Figure 5, it will be seen that a coupling 51 is provided having an externally threaded outlet 52 and an internally threaded inlet 53, the latter being adapted for attachment to a garden hose and the former being engageable with the threads 13 of the inlet 6 of the mixing device. Disposed within the axial bore 54 of the coupling is a conical valve element 56 lying on the axis of the bore with its apex directed towards the inlet 53. Valve 56 is formed of a resilient deformable material such as rubber and is held against axial displacement in a manner presently to be described. Thus, when fluid, whether liquid or gaseous, enters inlet 53, the pressure will force the base portions of the cone inwardly and permit the fluid to pass in an annular stream towards the coupling outlet. However, when the fluid pressure is reduced, the valve will be forced back into its conical shape and effectively prevent flow of fluid in either direction. In fact, any back pressure through the coupling would only seat the valve more firmly against the coupling bore.

Any suitable means might be utilized to restrain the conical valve 56 against axial displacement, and as here shown, such means include an annular ring 61 seated against a shoulder 62 in the coupling in the same manner as a conventional hose sealing gasket. An integral spider arrangement consisting of a plurality of ribs 63 extend inwardly from the ring and engage the apex of the cone, preferably being formed integrally therewith. In this manner, a single insert may be utilized for the conventional seal as well as for a check valve arrangement.

In Figure 4 a slightly modified arrangement is disclosed in which the outlet 7a is disposed substantially normal to the axis of the inlet 6. In this arrangement, instead of an axially aligned inlet and outlet as provided for in the device previously described, the outlet 7a is directed downwardly and at approximately right angles to the inlet. It has been found, particularly when the device is attached to an underground sprinkling system that this angular offset relationship may be preferred from a standpoint of economy in fittings or the like. However, insofar as construction and mode of operation are concerned it will be apparent that the flow of water and its effect in the fertilizer containing chamber 8 will be the same as that previously discussed. The main distinction will be that when the water passes out of the chamber 8 through the screen 33, it will not be required to make an additional bend as required in the arrangement shown in Figure 1, but will merely pass directly from the chamber 8 downwardly through bore 43a and out through the outlet 7a. Here again, the check valve coupling 51 may be threaded into the inlet for the purposes hereinabove explained.

From the foregoing description it will be appreciated that while the spray attachment of the instant invention is extremely simple in construction and operation, it provides an efficient method of feeding a water soluble fertilizer or like material from a tablet or solid form into a stream of water. While any suitable transparent material may be utilized for the cap member, in order to provide an easy way of ascertaining the need for replenishing the fertilizer, and from a standpoint of economy in production, the same may be conveniently constructed from one of the acrylate polymers which are widely used as glass substitutes.

What is claimed is:

1. Apparatus of the character described comprising an integral longitudinally extending body member having a fluid passage therein including a fluid inlet and a fluid outlet each adapted for releasable connection to a hose, means defining an opening in said member generally normal to and in communication with said passage intermediate the inlet and outlet thereof, said opening being of a size substantially as great as the cross-sectional extent of said passage, a cup-shaped closure releasably connected to said body with the open end thereof in communication with and aligned with said opening, a screen member overlying said opening and positioned between the latter and said open end of said closure, a fluid-impervious baffle in said member traversing said passage and forming an intermediate support for said screen member substantially medially of the ends thereof, said baffle serving to deflect fluid from said inlet through said screen member into said closure for emergence through a spaced portion of said screen member and into said fluid outlet.

2. A device of the character described comprising a longitudinally extending body member having a fluid passage therethrough, means defining axially aligned fluid inlets and outlets at opposite ends of said passage, means defining an opening intermediate said inlet and outlet in communication with said passage and having an axis substantially normal thereto, a screen member completely overlying said opening and supported adjacent the edges thereof by said body, a relatively thin baffle member traversing said passage and substantially aligned with an axis of said opening with one end of said baffle supporting a central portion of said screen, a boss having internal threads therein extending from said body along said opening axis, a cup-shaped closure element having an open end portion releasably engageable with said boss threads, said closure member defining a chamber for receiving a water soluble material to be supported on said screen whereby fluid entering said inlet will pass through said fluid passage and through said opening into said chamber and thereafter will pass from said chamber through said fluid outlet.

References Cited in the file of this patent

UNITED STATES PATENTS

| | | |
|---|---|---|
| 1,740,879 | Sonner | Dec. 24, 1929 |
| 2,128,050 | Landis | Aug. 23, 1938 |
| 2,142,947 | Kretzschmar | Jan. 3, 1939 |
| 2,178,735 | Behrman | Nov. 7, 1939 |
| 2,606,068 | Bonacor | Aug. 5, 1952 |
| 2,621,889 | Annin | Dec. 16, 1952 |

FOREIGN PATENTS

| | | |
|---|---|---|
| 727,213 | Germany | Oct. 29, 1942 |